Patented Jan. 12, 1954

2,665,970

UNITED STATES PATENT OFFICE 2,665,970

PRECIPITATION OF VANADIUM OXIDES

Jack Halpern and Frank A. Forward, Vancouver, British Columbia, Canada, assignors to National Research Council, Ottawa, Ontario, Canada, a body corporate No Drawing. Application December 26, 1952, Serial No. 328,138

4 Claims. (Cl. 23—140)

This invention relates to the precipitation of vanadium from aqueous solutions and is applicable to the treatment of any such basic or neutral solution containing any pentavalent vanadium salt, such as $NaVO_3$, $NH_4VO_3$ and $V_2O_5$.

Vanadium is generally present in neutral and basic solutions in the form of the vanadate ion, $CO_3^-$; that is the vanadium is in the pentavalent state. It is difficult to precipitate vanadium from such solutions and known methods for extracting vanadium from such leach solutions involve neutralizing the solution with acid. This renders the solution unsuitable for reuse in leaching further material and thus prevents cyclic operation.

The object of the present invention is to provide a method for precipitating vanadium from such solutions without destroying or unduly contaminating the solution, in order that the solution may be reused in convenient and efficient cyclic operation.

In accordance with the invention the solution is treated in a closed vessel with gaseous molecular hydrogen, under a positive partial pressure, in the presence of a hydrogenation catalyst to reduce the pentavalent vanadium to a lower valence state, in which form it is insoluble in the solution and precipitates as illustrated by the equation

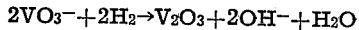

$$2VO_3^- + 2H_2 \rightarrow V_2O_3 + 2OH^- + H_2O$$

Any basic or neutral solution containing vanadium in pentavalent form may be treated. It is desirable to have present in the solution some electrolyte to prevent formation of a colloidal precipitate. The solution may contain sodium sulphate, sodium carbonate, sodium bicarbonate, sodium hydroxide or the like.

The rate of precipitation increases with increase in temperature, being substantially doubled by an increase of 50° F. in temperature. While the reaction proceeds over a wide range of temperature, 125 to 400° F. and higher having been used, the preferred range is 250° to 350° F. Below 200° F. the rate of precipitation is low. The rate of precipitation is essentially independent of the initial vanadium concentration of the solution. An advantageous feature of the method is that the time required for precipitation is proportional to the initial vanadium concentration and is thus small for low grade solutions.

Standard hydrogenation catalysts such as nickel or cobalt may be used. Nickel is preferred. For a given catalyst in powder form the rate of precipitation is directly proportional to the amount of catalyst present. For commercial operation about 0.5 gm. of nickel powder per litre of solution is a practical lower limit and the partial pressure of hydrogen in the reaction zone should have a positive value of not less than three pounds per square inch.

The following example illustrates the operation of the method of the invention.

A solution containing 50 gm. per litre sodium carbonate and 5.4 gm. per litre $V_2O_5$ (3.0 gm./1 V) was placed in an autoclave with 10 gm. per litre of nickel powder. The autoclave was closed and the solution heated with continuous agitation to a temperature of 300° F. Hydrogen gas was introduced up to a total pressure of 352 p. s. i. g., the hydrogen partial pressure being 300 p. s. i. This temperature and pressure were maintained for four hours, when analysis of the solution showed only 0.1 gm. per litre of vanadium remaining unprecipitated. The pressure was released, the reaction mixture discharged and filtered to separate the precipitated vanadium ($V_2O_3$) along with the nickel catalyst. The latter was removed from the $V_2O_3$ by magnetic separation and reused.

What is claimed is:

1. A method of extracting vanadium oxide from aqueous solutions containing it in pentavalent form which comprises heating the solution in a closed reaction zone in the presence of a hydrogenation catalyst and hydrogen under a positive partial pressure of at least three pounds per square inch at a temperature of 125 to 400° F. to precipitate the vanadium oxide.

2. The method defined in claim 1 wherein the catalyst is separated from the precipitated vanadium oxide for reuse.

3. The method defined in claims 1 and 2 wherein the solution is heated at a temperature of 250 to 350° F.

4. A method of treating aqueous carbonate solutions containing vanadium in pentavalent form which comprises adding a nickel powder catalyst to the solution, heating the solution in the presence of the catalyst and hydrogen in a closed reaction zone, agitating the mixture, mounting within the reaction zone a positive partial pressure of hydrogen of not less than three pounds per square inch while heating to a temperature of 250 to 350° F. to precipitate vanadium in an insoluble form as vanadium oxide and separating the vanadium oxide from the solution and from the catalyst.

JACK HALPERN.
FRANK A. FORWARD.

No references cited.